US 3,285,822
Patented Nov. 15, 1966

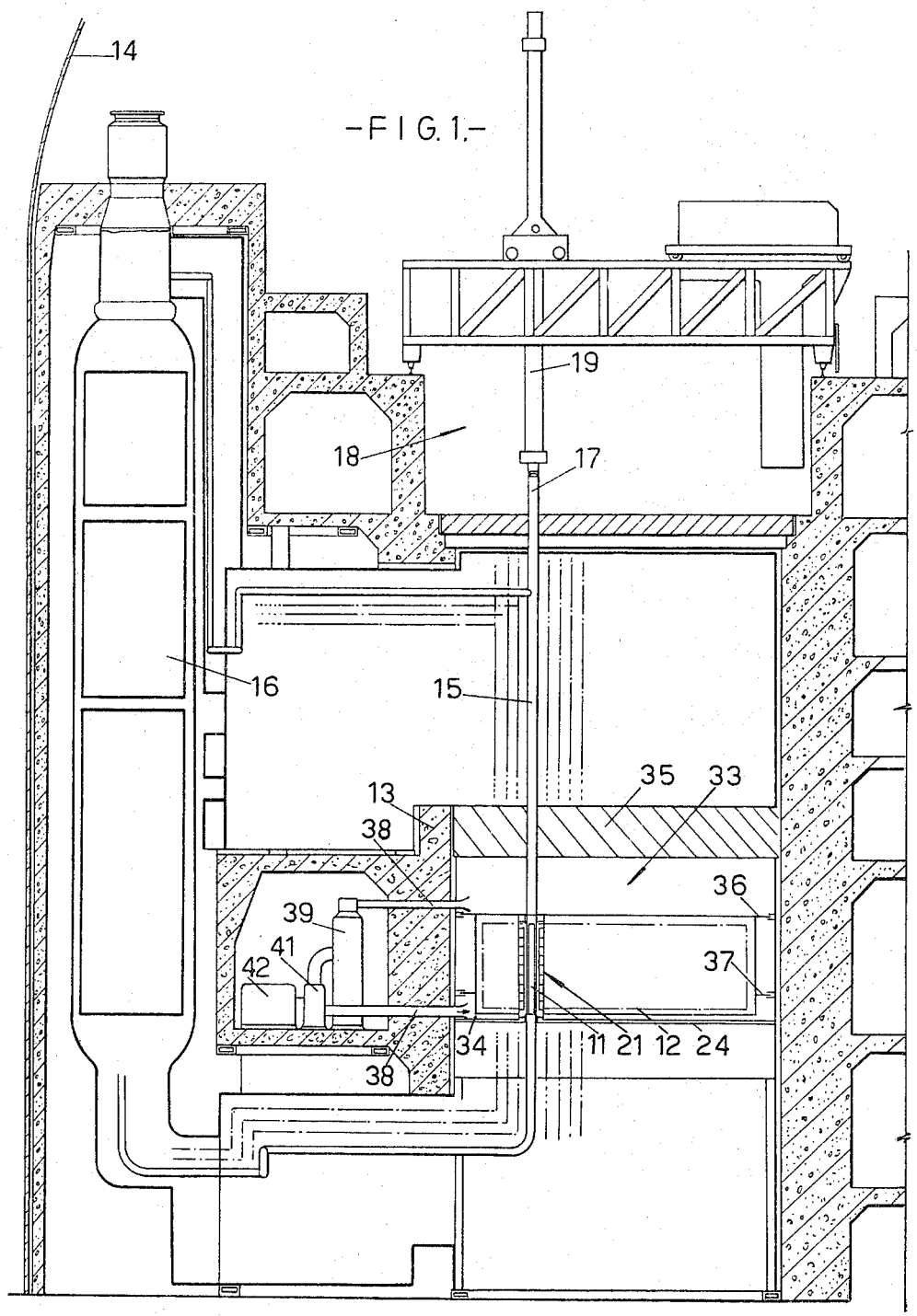

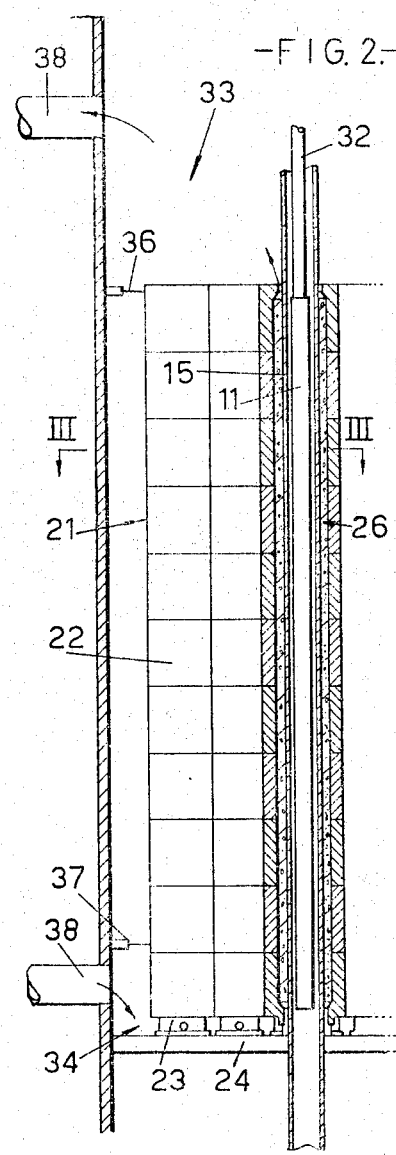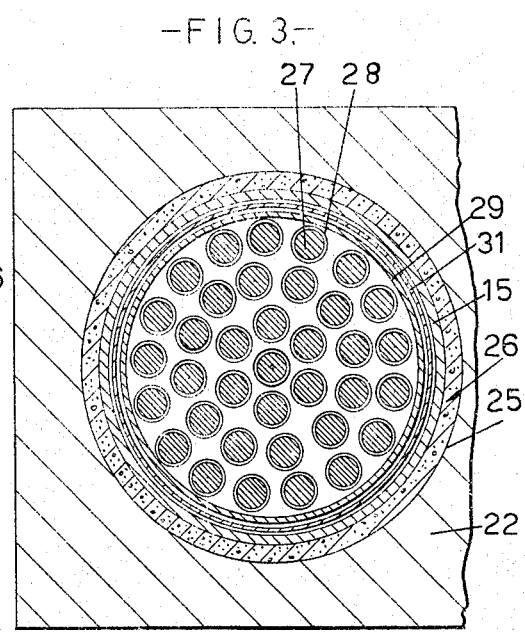

3,285,822
NUCLEAR REACTOR
Ronald Tunstall Ackroyd, Upton by Chester, England, assignor to United Kingdom Atomic Energy Authority, London, England
Filed Mar. 30, 1964, Ser. No. 355,798
8 Claims. (Cl. 176—42)

This invention relates to nuclear reactors.

There is a class of nuclear reactor in which reactivity control is effected by shifting the spectrum of neutron energies in the reactor core. This spectral shift is effected by varying the neutron moderation in the core. In one nuclear reactor suggested by M. C. Edlund (U.S. patent specification No. 3,081,246), neutron moderation is effected by a water moderator, the slowing down power of which is varied by altering the ratio of heavy to light water in the moderator. It is one object of this invention to provide alternative means for varying the neutron moderation in a nuclear reactor.

Accordingly, in a nuclear reactor having a reactor core wherein nuclear fuel is subject to fission by neutrons with generation of heat, the present invention provides a system for variable moderation in the core comprising a gaseous neutron moderator, a flowpath for circulation of the moderator through the core, sorbent material in the flowpath within the core whereby the moderator is retained in the core by sorption, and means to vary the moderator content of the core by variation of the sorption conditions. The term sorption is here used as defined by Stephen Brunauer of the U.S. Department of Agriculture in his book "The Adsorption of Gases and Vapours," copyright 1943 by Princeton University Press.

Preferably the sorbent material is a metallic hydride, such as zirconium hydride, and the gaseous moderator is hydrogen. In one embodiment of the invention a nuclear reactor comprises a core of nuclear fuel elements, pressure tubes enclosing the fuel elements, a flowpath for circulation of gaseous reactor coolant through the pressure tubes, a graphite moderator structure penetrated by the pressure tubes, an annular interspace between each pressure tube and the surrounding graphite, porous zirconium hydride filling the interspaces, a gaseous mixture of hydrogen and helium, a flowpath for circulation of the gaseous mixture through the interspaces, and means for varying the concentration of hydrogen in the gaseous mixture thereby to vary the hydrogen content of the zirconium hydride within the range defined by hydrogen/zirconium ratios of 1.4 and 2.0.

One construction of nuclear reactor embodying the invention will now be described by way of example with reference to the accompanying drawings in which:

FIGURE 1 is a sectional elevation of the reactor,

FIGURE 2 is an enlarged sectional view of part of FIGURE 1, and

FIGURE 3 is a section through one reactor cell on the line III—III of FIGURE 2.

The reactor now to be described is a modified gas-cooled, graphite-moderated reactor; structurally the reactor is of pressure tube design to permit use of a gaseous reactor coolant at high pressure. Nuclear fuel elements 11 are arranged in a reactor core 12 which is surrounded by concrete biological shielding 13 and a gas-tight, pressure-resistant containment shell 14. Each fuel element is located in a pressure tube 15, there being a plurality of separate pressure tubes 15 which define a flowpath for circulation of gaseous reactor coolant, in the form of carbon dioxide, through the core and through heat exchangers 16 disposed around the core. Heat abstracted by the coolant from the fuel elements is delivered to the heat exchangers 16 in which steam is generated for utilisation in electricity generation. The portions of the pressure tubes within the core are made of zircalloy to reduce unproductive neutron absorption in the tubes. In order to facilitate charge and discharge of fuel elements, each pressure tube 15 is formed with a branch tube 17 which extends vertically upwards above the core to a fuel handling arena 18 provided with fuel handling machinery 19. The reactor is provided with conventional reactor control rods (not shown).

The pressure tubes 15 penetrate a graphite moderator structure 21 which is constituted by stacks of graphite bricks 22 (FIGURES 2 and 3). The graphite bricks 22 are cubic and are stacked on stools 23 supported by core support structure 24. At positions at which the graphite structure is penetrated by the pressure tubes, each of the graphite bricks is formed with a central bore 25 which is of larger internal diameter than the external diameter of the associated pressure tube so that an annular interspace 26 is interposed between each pressure tube and the surrounding graphite. The fuel elements 11 comprise assemblies of 37 elongate fuel rods 72 (FIGURE 3) which are of enriched uranium oxide clad in stainless steel cladding 28. The assembly of rods is housed in a stainless steel sleeve 29 and a zircalloy liner 31 is interposed between the sleeve 29 and the pressure tube 15. Each fuel element is suspended by an elongate hanger 32.

Each interspace 26 is filled with porous zirconium hydride in the form of a sponge which is permeated by a gaseous mixture of hydrogen and helium. The graphite walling of each interspace which is exposed to this gaseous mixture is sealed by a coating of zirconium metallization. The zirconium hydride being sorbent, it will have a content of hydrogen which is dependent upon the sorption conditions at the interface between the hydride and the hydrogen gas. The upper and lower ends of the interspaces 26 are reduced in diameter but are open to an upper outlet plenum 33 and a lower inlet plenum 34. The upper plenum 33 is bounded by an upper concrete shield 35 and a web 36 sealing between the upper face of the core and the surrounding shielding; the lower plenum 34 is bounded by the core support 24 and a second web 37 sealing between the core and the surrounding shielding. A flowpath for circulation of the gaseous mixture through the interspaces 26 includes ducts 38, a heat exchanger 39, and a circulator 41; a unit 42 enables variation of the concentration of hydrogen in the gaseous mixture. Neutron moderation in the reactor core is effected partly by the graphite and partly by the hydrogen retained in the zirconium hydride.

A detailed specification for the reactor described above is as follows:

| | |
|---|---|
| Reactor gross heat output | 3090 M.W. |
| Net electrical output | 1000 M.W. |
| Max. coolant pressure | 600 lb./sq. in. g. |
| Max. coolant temperature, inlet | 310° C. |
| Max. coolant temperature, outlet | 561° C. |
| Total coolant flow | 20,500 lb./sec. |
| Core diameter (theoretical) | 32.9 ft. |
| Diameter including graphite side reflectors | 34.9 ft. |
| Core length | 11 ft. |
| Length including graphite reflector | 13 ft. |
| Number of pressure tubes | 1900. |
| Pressure tube lattice pitch | 8 in. x 8 in. |
| Weight of uranium | 234 Te. |
| Average rating | 12.8 M.W./Te. |
| Average thermal neutron flux in fuel | $10^{13}$ n/sec. cm$^2$. |
| Fuel | $UO_2$: S.G. 10.4 gm./cm.$^3$. |

| | |
|---|---|
| Fuel enrichment: N5/N8 | 1/15. |
| Fuel configuration | Rod with inert magnesium core. |
| Rod dimensions: | |
| Outer diam. | 0.474 in. |
| Inner diam. | 0.16 in. |
| Length of fuel rod | 66 in. |
| Number of rods in a fuel assembly | 37. |
| Number of assemblies in a pressure tube | 2. |
| Weight of $UO_2$ per pressure tube | 0.1295 Te. |
| Fuel rod cladding | Stainless steel. |
| Thickness of cladding | 0.010 in. |
| Max. surface temperature of cladding | 650° C. |
| Mean fuel temperature | 830° C. |
| Fuel element sleeve | Stainless steel. |
| Inner diameter | 4.5 in. |
| Thickness | 0.11 in. |
| Pressure tube liner | Zirconium alloy. |
| Inner diameter | 4.714 in. |
| Thickness | 0.055 in. |
| Pressure tube (within core) | Zirconium alloy. |
| Inner diameter | 4.984 in. |
| Thickness | 0.196 in. |
| Volume ratio: stainless steel/fuel | 0.14. |
| Volume ratio: zirconium/fuel | 0.70. |
| Graphite dimensions | 8 in. cube. |
| internal bore diameter | 6.019 in. |
| Zirconium hydride annular thickness | 0.31 in. |
| Weight of graphite in core | 178 Te. |
| Weight of graphite in reflector | 22 Te. |
| Weight of zirconium hydride in core | 70 Te. |

In the present reactor, the possibility of varying the neutron moderation in the reactor core is employed to control long term reactivity effects such as are caused by burn-up of the fuel in the core; other requirements for reactivity control, for example reactor power level changes and variations in the xenon content of the core, are met by conventional control rods. The application of variable neutron moderation to compensate for burn-up of fuel in the reactor core is of considerable value primarily because it obviates the conventional method in which neutron absorber material is incorporated in the core at the start of the core life and withdrawn progressively as fuel in the core is consumed. The conventional method is associated with unproductive absorption of neutrons at the start of core life and is undesirable for this reason. In contrast, the method of compensation of spectral shift involves absorption of excess neutrons at the start of core life in fertile uranium isotopes with production of fissile material.

The variable neutron moderation in the reactor core is achieved by variation of the hydrogen content of the zirconium hydride in the interspaces. In this manner the neutron moderation effected by the zirconium hydride is varied whilst the neutron moderation effected by the graphite remains substantially constant. The zirconium hydride in these interspaces is present in its delta phase (as defined in NAA-SR-5015). In this phase the zirconium hydride has a hydrogen content due to sorption of hydrogen in the hydride with a resultant hydrogen/zirconium ratio between 1.4 and 2.0. If the zirconium hydride is in the presence of gaseous hydrogen it is possible to vary the hydrogen/zirconium ratio between these limits by varying the sorption conditions, that is to say by varying the temperature of the zirconium hydride or the pressure of the gaseous hydrogen. Thus, if the temperature of the zirconium hydride is maintained at 600° C., it is possible to vary the hydrogen/zirconium ratio between 1.4 and 2.0 by varying the pressure of incident hydrogen between 1 mm. Hg to 760 mm. Hg. Alternatively, if the pressure of incident hydrogen is maintained at 100 mm. Hg, it is possible to vary the hydrogen/zirconium ratio between 1.4 and 2.0 by varying the temperature of the hydride between 800° C. and 450° C. approximately. In view of the low hydrogen pressure of 1 mm. Hg appropriate to a hydrogen/zirconium ratio of 1.4 at 600° C., it is arranged that the hydrogen is mixed with an inert carrier gas which is chosen to be helium. The gaseous mixture of hydrogen and helium is circulated through the interspaces 26 by the circulator 41. The temperature of the gaseous mixture and thus of the hydride is adjusted by the heat exchanger 39. The pressure of the gaseous mixture is maintained constant at about 2 atmospheres and the concentration of hydrogen in the mixture is adjusted in the unit 42; this variation of hydrogen concentration is such that the hydrogen partial pressure in the gaseous mixture is varied between 1 mm. Hg and 760 mm. Hg. The unit 42 may be of conventional form, for example reservoirs of hydrogen and helium, valves for the introduction of required quantities of hydrogen or helium, a valve for the removal of a corresponding quantity of gaseous mixture, and separation plant for separating the components of the gaseous mixture removed thereby. The variation of the hydrogen/zirconium ratio in the hydride may be effected most rapidly by combined variations of the temperature and pressure of the gaseous mixture of hydrogen and helium. Once a desired hydrogen/zirconium ratio has been reached, it is preferable to bring the temperature of the gaseous mixture back to an operational level (say 600° C.) whilst maintaining the hydrogen/zirconium ratio constant by further variation of the hydrogen pressure.

By the means described above, it is possible to vary the sorption conditions governing the hydrogen content in the zirconium hydride so as to vary the hydrogen/zirconium ratio between 1.4 and 2.0. In the reactor described above it is found that this variation of hydrogen content causes sufficient change in the overall neutron moderation to induce an 8% change in the reactivity $Dk$, the reactivity being increased as the hydrogen content is increased. Accordingly the variable neutron moderation caused by this variation of hydrogen content can be employed to compensate for decreasing reactivity due to burn-up of fuel in the reactor as described.

In one method of operating the reactor the gaseous mixture of hydrogen and helium is maintained at a temperature of 500° C. Under these conditions the hydrogen partial pressure is reduced to 0.005 mm. Hg which corresponds to a hydrogen/zirconium ratio of 1.45. The reactor is loaded with excess fuel such that criticality is achieved with a neutron spectrum appropriate to this ratio. As the fuel in the core is consumed the hydrogen partial pressure is progressively increased to cause increased sorption of hydrogen in the zirconium hydride and thus increased neutron moderation in the core sufficient to maintain the reactor critical. A typical set of hydrogen partial pressures for reactor operation in this manner over a period of 500 days is as follows:

| Burn-up days | Hydrogen partial pressure mm. Hg at 500° C. | Hydrogen/zirconium ratio |
|---|---|---|
| 0 | 0.003 | 1.45 |
| 100 | 0.02 | 1.53 |
| 200 | 0.2 | 1.63 |
| 300 | 3 | 1.75 |
| 400 | 50 | 1.87 |
| 500 | 900 | 1.99 |

By compensating for reactivity loss due to fuel burn-up in this manner, it is found that an average fuel burn-up of 7000 M.W.D./TeU can be obtained. The average conversion factor for the core is initially 0.66 and falls to 0.63 at the end of the core life when the neutron moderation has reached its highest value.

It will be understood that other reactors may be devised by those skilled in the art to utilise the method of achieving variable neutron moderation provided by the present invention. It is envisaged that in such other reactors the variation of neutron moderation may be employed to control reactivity changes caused by effects other than fuel burn-up. Moreover, it is envisaged that the gaseous moderator could be other than hydrogen, for example deuterium, and that sorbent materials other than zirconium hydride, for example titanium hydride or even mixtures of hydrides, might be located in the reactor core to retain the gaseous moderator by sorption. In the reactor described the zirconium hydride is incorporated in a sponge form; however, the hydride might be incorporated in particulate form or even in the form of a solid sleeve. Finally it will be understood that the invention is applicable to reactors cooled by alternative coolants, for example water, and fuelled by alternative fuels; it is envisaged that thorium could be incorporated in the fuel as fertile material.

What I claim is:

1. In a nuclear reactor having a reactor core wherein nuclear fuel is subject to fission by neutrons with generation of heat, a system for variable neutron moderation in the core comprising a gaseous neutron moderator, a flowpath for circulation of the moderator through the core, sorbent material in the flowpath within the core whereby the moderator is retained in the core by sorption, and means to vary the moderator content of the core by variation of the sorption conditions.

2. In a nuclear reactor having a reactor core wherein nuclear fuel is subject to fission by neutrons with generation of heat, a system for variable neutron moderation in the core comprising a gaseous neutron moderator, a flowpath for circulation of the moderator through the core, sorbent material in the flowpath within the core whereby the moderator is retained in the core by sorption, and means to vary the moderator content of the sorbent material by variation of the temperature of the sorbent material.

3. In a nuclear reactor having a reactor core wherein nuclear fuel is subject to fission by neutrons with generation of heat, a system for variable neutron moderation in the core comprising a gaseous neutron moderator, a flowpath for circulation of the moderator through the core, sorbent material in the flowpath within the core whereby the moderator is retained in the core by sorption, and means to vary the moderator content of the sorbent material by variation of the pressure of the gaseous moderator incident upon the sorbent material.

4. In a nuclear reactor having a reactor core wherein nuclear fuel is subject to fission by neutrons with generation of heat, a system for variable neutron moderation in the core comprising a gaseous mixture containing a gaseous neutron moderator, a flowpath for circulation of the gaseous mixture through the core, sorbent material in the flowpath within the core whereby the moderator is retained in the core by sorption, and means to vary the moderator content of the sorbent material by variation of the concentration of moderator in the gaseous mixture.

5. In a nuclear reactor having a reactor core wherein nuclear fuel is subject to fission by neutrons with generation of heat, a system for variable neutron moderation in the core comprising gaseous hydrogen, a flowpath for circulation of the hydrogen through the core, a metallic hydride in the flowpath within the core, and means to vary the hydrogen content of the hydride by variation of the conditions of equilibrium between the metallic hydride and the hydrogen.

6. In a nuclear reactor having a reactor core wherein nuclear fuel is subject to fission by neutrons with generation of heat, a system for variable neutron moderation in the core comprising gaseous hydrogen, a flowpath for circulation of the hydrogen through the core, zirconium hydride in the flowpath within the core, and means to vary the hydrogen content of the zirconium hydride within the range defined by hydrogen/zirconium ratios of 1.4 and 2.0 by variation of the conditions of equilibrium between the zirconium hydride and the hydrogen.

7. In a nuclear reactor having a reactor core wherein nuclear fuel is subject to fission by neutrons with generation of heat, a system for variable neutron moderation in the core comprising a gaseous mixture of hydrogen and helium, a flowpath for circulation of the gaseous mixture through the core, zirconium hydride in the flowpath within the core, and means to vary the concentration of hydrogen in the gaseous mixture thereby to vary the hydrogen content of the zirconium hydride within the range defined by hydrogen/zirconium ratios of 1.4 and 2.0.

8. A nuclear reactor comprising a core of nuclear fuel elements, pressure tubes enclosing the fuel elements, a flowpath for circulation of gaseous reactor coolant through the pressure tubes, a graphite moderator structure penetrated by the pressure tubes, an annular interspace between each pressure tube and the surrounding graphite, porous zirconium hydride filling the interspaces, a gaseous mixture of hydrogen and helium, a flowpath for circulation of the gaseous mixture through the interspaces, and means for varying the concentration of hydrogen in the gaseous mixture thereby to vary the hydrogen content of the zirconium hydride within the range defined by hydrogen/zirconium ratios of 1.4 and 2.0.

References Cited by the Examiner

UNITED STATES PATENTS

| | | | |
|---|---|---|---|
| 3,142,624 | 7/1964 | Edlund | 176—42 X |
| 3,164,525 | 1/1965 | Wetch et al. | 176—42 X |

REUBEN EPSTEIN, *Primary Examiner.*